M. W. SLADE.
GARDEN FRAME AND LIKE STRUCTURE.
APPLICATION FILED JULY 23, 1919.
1,331,388.
Patented Feb. 17, 1920.
2 SHEETS—SHEET 1.
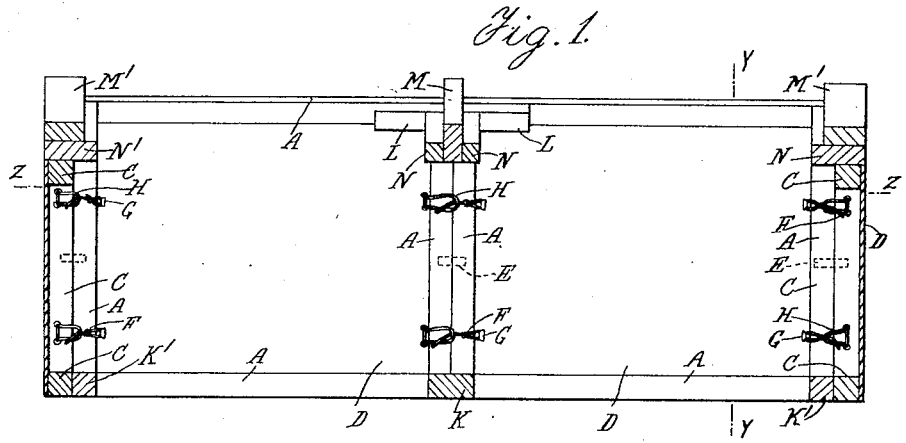
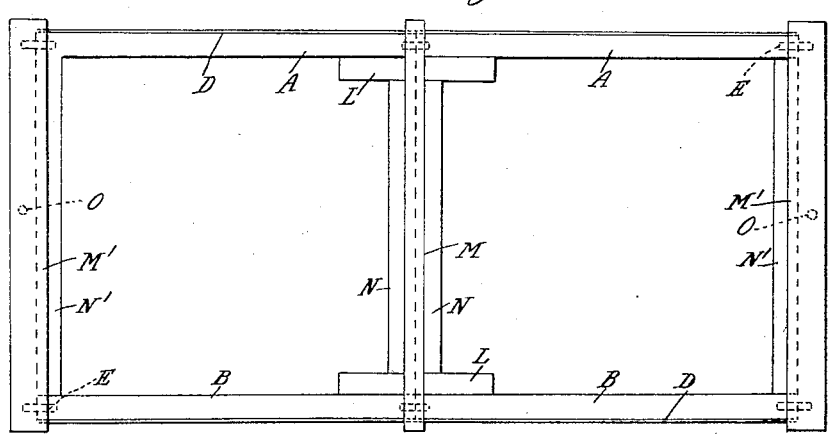
Witnesses
Inventor
Marcus W. Slade,
by
Attorney.

M. W. SLADE.
GARDEN FRAME AND LIKE STRUCTURE.
APPLICATION FILED JULY 23, 1919.
1,331,388.
Patented Feb. 17, 1920.
2 SHEETS—SHEET 2.
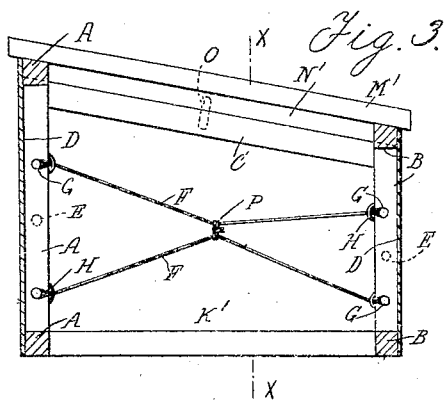
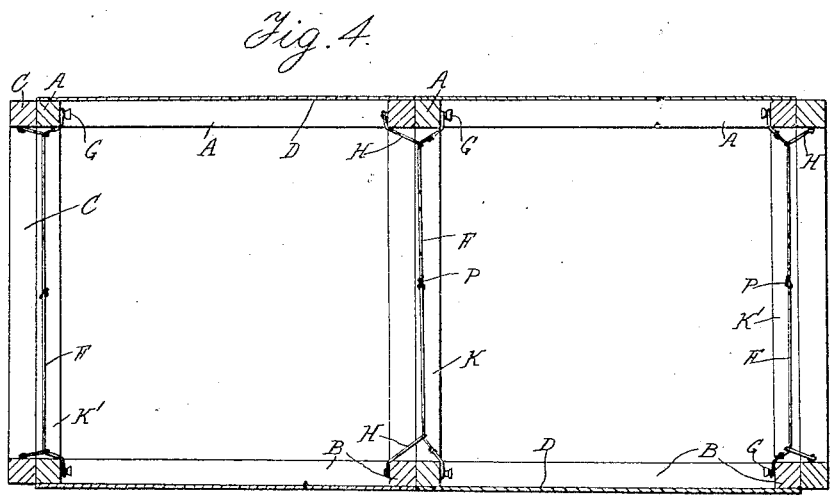

UNITED STATES PATENT OFFICE.

MARCUS WARRE SLADE, OF LONDON, ENGLAND.

GARDEN-FRAME AND LIKE STRUCTURE.

1,331,388.   Specification of Letters Patent.   Patented Feb. 17, 1920.

Application filed July 23, 1919. Serial No. 312,705.

*To all whom it may concern:*

Be it known that I, MARCUS WARRE SLADE, a subject of the King of Great Britain, residing at London, England, have invented new and useful Improvements in Garden-Frames and like Structures, of which the following is a specification.

This invention relates to improvements in garden frames and like structures of the kind comprising separable members held together by flexible wires or cords, and has for its object a novel construction of frame built up in parts which can be readily assembled and dismantled when desired. The frame can be made of any length or height by inserting additional parts, either glazed or not as desired. When the frame is dismantled, the parts can be packed together in small compass and transported very conveniently. Moreover, the frame can be made very cheaply.

My improved frame comprises, front, back and side members, which are held together by flexible cords or wires and distance pieces with or without dowel pins or lips or ledges for convenience in effecting alinement of the parts. The cords or wires are arranged in pairs so that by passing a cord or wire around each pair and tightening up, tension can be put into the binding cords or wires and the whole structure thus made very rigid and firm. The binding cords or wires are passed through loops on the side members or ends, as the case may be, and over pins in the adjoining side member or end.

When such cords or wires are tensioned the end and side member adjoining, or two side members adjoining, are firmly gripped together longitudinally and at the same time through distance pieces placed top and bottom of each section are firmly gripped laterally to the end or opposite side member, as the case may be.

A frame made according to my invention is illustrated in the accompanying drawing, in which:

Figure 1 shows a longitudinal vertical section, on the line X—X, Fig. 3, of a garden frame comprising two units in length and one in height constructed according to this invention.

Fig. 2 is a plan view thereof.

Fig. 3 shows a transverse vertical section on the line Y—Y, Fig. 1, and

Fig. 4 shows a horizontal section on the line Z—Z, Fig. 1.

A, A are back members, B, B front members, and C, C side members. Each of said members is constituted by a skeleton framework, e. g. of wood, to which is nailed or screwed a thin sheet of india rubber fabric, uralite, asbestos, or other suitable material D. The said members are shown provided with dowel pins E, E fixed in one member and adapted to enter corresponding holes in the adjoining member, thus retaining said members in position. These dowel pins are however not essential, but are useful in facilitating and retaining the alinement of the parts.

A frame may thus be built up comprising two side members between which are arranged one or any convenient number of back and front members. The sides of the front and back members are further connected by pairs of flexible cords or wires F, F which are looped at their ends to engage with pins G, G fixed in the members to be held together. Said wires or cords also pass through loops H, H connected to adjacent members, for example the wires connecting the left hand ends of the left hand front and back members, in Fig. 1, pass through loops secured to the left hand side members C. Similar wires and loops are provided at each side of each pair of front and back members.

A distance piece K is placed between the front and back members at the bottom of the frame, where front and back members adjoin one another, and distance pieces K' secured to the side members C come between the front and back members when these members adjoin such a side member.

The upper edges of the front and back members, where front members and back members adjoin, are held apart by cross pieces L, L at the ends of a batten M resting on the said upper edges and provided with lateral strips N. Where the front and back members adjoin a side member these front and back members are held apart by a strip N' secured to a batten M' these parts being connected to the side member by a dowel pin O. The battens M, M' and strips N, N' form guides for the glazed top members of the frame which glazed members are constructed as heretofore. When the parts are all assembled, the binding wires or cords F, F are drawn together by tying cords P around each pair of wires and tightening up, and the whole frame is thus held firmly together and made quite rigid.

It is obvious that the height of the frame can be increased, if desired, by additional front, back and side members placed on the lower corresponding members; lips, ledges or dowel pins being used, if desired, to insure alinement. One or more of said members may be glazed, if desired.

What I claim is:—

1. A garden frame comprising separable back, front and side members, cords by means of which the said members are held together, said cords being arranged in pairs, and tightening cords arranged to draw together and thereby tighten the members of each of the said pairs of cords respectively.

2. A garden frame comprising separable back, front and side members, distance pieces arranged between the back and front members, cords arranged in pairs to hold the said members together, and tightening cords arranged to draw together the members of each of the said pairs of cords respectively.

3. A garden frame comprising separable back, front and side members, dowel pins arranged to maintain the abutting parts of the several members in alinement, cords arranged in pairs to hold the said members together, and tightening cords arranged to draw together the members of each of the said pairs of cords respectively.

4. A garden frame comprising separable back, front and side members, loops on said members, pins projecting from said members, the pins and loops being arranged so that for each loop a corresponding pin is provided on another member abutting against the member carrying the said loop, cords arranged in pairs with each end of each cord passing through a corresponding loop and engaging a corresponding pin, and tightening cords arranged to draw together the members of each of the said pairs of cords to hold together the said back, front and side members in the longitudinal and transverse directions simultaneously.

5. A garden frame comprising separable framelike members, sheets of fabric secured to said members, cords extending between said members in pairs, and tightening cords arranged to draw together and tighten each pair of the first mentioned cords.

6. A garden frame comprising back, front and side members, battens resting on the upper edges of the said members, distance pieces carried by the said battens, cords arranged in pairs to hold said members together, and tightening cords arranged to draw together the members of each pair of the said cords.

MARCUS WARRE SLADE.

Witnesses:
 GEORGE HARRISON,
 HERBERT A. BEESTON.